United States Patent
Pistoia et al.

(10) Patent No.: US 9,251,352 B2
(45) Date of Patent: Feb. 2, 2016

(54) QUANTITATIVE ANALYSIS OF INFORMATION LEAKAGE VULNERABILITIES

(71) Applicant: International Business Machines Corporation, Armonk, NY (US)

(72) Inventors: Marco Pistoia, Amawalk, NY (US); Omer Tripp, Bronx, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/661,145

(22) Filed: Mar. 18, 2015

(65) Prior Publication Data

US 2015/0193623 A1 Jul. 9, 2015

Related U.S. Application Data

(63) Continuation of application No. 14/102,613, filed on Dec. 11, 2013, now Pat. No. 9,081,968.

(51) Int. Cl.
*G06F 21/74* (2013.01)
*G06F 21/57* (2013.01)
*H04L 29/08* (2006.01)
*H04L 12/24* (2006.01)
*G06F 21/54* (2013.01)
(Continued)

(52) U.S. Cl.
CPC .............. *G06F 21/577* (2013.01); *G06F 21/54* (2013.01); *G06F 21/74* (2013.01); *H04L 12/24* (2013.01); *H04L 67/125* (2013.01); *G06F 3/04815* (2013.01); *G06F 9/4812* (2013.01); *G06F 2221/033* (2013.01)

(58) Field of Classification Search
CPC ...... G06F 21/74; G06F 9/4812; H04L 67/125
USPC ......................................................... 726/22
See application file for complete search history.

(56) References Cited

U.S. PATENT DOCUMENTS 6,442,212 B1 * 8/2002 Kratochwil ........... H04L 1/0054
375/265
7,574,747 B2 * 8/2009 Oliveira .................. G06F 21/10
713/168

(Continued)

FOREIGN PATENT DOCUMENTS

JP       2009225084       10/2009

OTHER PUBLICATIONS

Liang et al., "A Dynamic Evaluation of the Precision of Static Heap Abstractions", Proceedings of the ACM international conference on Object oriented programming systems languages and applications pp. 411-427 ACM New York, NY, USA © 2010.

(Continued)

*Primary Examiner* — Dao Ho
(74) *Attorney, Agent, or Firm* — Harrington & Smith

(57) ABSTRACT

A method includes recording, during execution of a program and by a computing system, concrete values exhibited at source and sink statements in the program. The source statements read confidential information and the sink statements release the confidential information to an outside environment. The method includes determining, by the computing system, using at least the recorded concrete values and source-sink pairs whether information leakage meeting one or more quantitative criteria occurs by the program. Apparatus and program products are also disclosed.

21 Claims, 5 Drawing Sheets

(51) Int. Cl.
  *G06F 3/0481* (2013.01)
  *G06F 9/48* (2006.01)

(56) References Cited

U.S. PATENT DOCUMENTS

| | | | |
|---|---|---|---|
| 7,599,491 B2 | 10/2009 | Lambert | |
| 8,726,392 B1* | 5/2014 | McCorkendale | G06F 12/14 713/188 |
| 8,881,293 B1* | 11/2014 | Brucker | G06F 21/577 717/126 |
| 2003/0083831 A1 | 5/2003 | Agrawal et al. | |
| 2004/0139346 A1* | 7/2004 | Watt | G06F 21/74 713/166 |
| 2005/0212818 A1* | 9/2005 | Hudson, Jr. | G06F 17/30958 345/619 |
| 2009/0119648 A1* | 5/2009 | Chess | G06F 11/3608 717/131 |
| 2010/0070974 A1* | 3/2010 | Inoue | G06F 9/5016 718/101 |
| 2011/0107297 A1* | 5/2011 | Chandra | G06F 11/3608 717/110 |
| 2012/0010919 A1* | 1/2012 | Aswal | G06Q 10/04 705/7.25 |

OTHER PUBLICATIONS

Alvim et al., "Probabilistic Information Flow", IEEE Computer Society, 2010 25th Annual IEE Symposium on Logic in Computer Science.

Mccamant, "Quantitative Information Flow as Network Flow Capacity", MIT Computer Science and AI Lab, Mar. 31, 2008.

Tripp et al., "TAJ: EffectiveTaint Analysis of Web Applications", PLDI '09 Jun. 15-19, 2009, Dublin, Ireland, ACM 978-1-60558-392-Jan. 9, 2006.

Tripp et al., "Hybrid Analysis for JavaScript Security Assessment", 2010 ACM1-58113-000-00/00/00/0010, Conference '10, Month 1-2, 2010.

* cited by examiner

QUANTITATIVE ANALYSIS OF INFORMATION LEAKAGE VULNERABILITIES

CROSS-REFERENCE TO RELATED APPLICATIONS

The instant application is a continuation application of U.S. patent Ser. No. 14/102,613, filed on Dec. 11, 2013, the disclosure of which is hereby incorporated by reference in its entirety.

BACKGROUND

This invention relates generally to analysis of program code and, more specifically, relates to static and run-time analysis of program code.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

A main security threat in web and mobile applications is leakage of secret data. Such leakage may include private information, such as a person's contact list, as well as confidential information like sensitive email content (especially under a "bring your own device" policy). An application may also leak details about its internal implementation, such as the type and version of its backend database, which could be used by an attacker in crafting other attacks (such as an SQL, Structured Query Language, injection attack for the example of a database).

An important source of difficulty in dealing with information leakage is to decide whether the released information indeed constitutes a secret. Here is an example from the mobile telecommunications area.

The International Mobile Station Equipment Identity (IMEI) is a number, usually unique, that identifies 3GPP (third Generation Partnership Project) and iDEN (integrated Digital Enhanced Network) mobile phones as well as certain satellite phones. The IMEI consists of 16 digits: the Type Allocation Code (TAC) is the first 8 digits. The TAC provides the model and origin of the device. The next 6 digits are a manufacturer-defined number known as SNR (serial number). Finally, the last digit is a Luhn check digit, which is a digit created based on the Luhn algorithm and used to validate the IMEI.

The standard approach to detection of information leakage problems is to track whether there is data flow from a source statement reading confidential information to a sink statement releasing this information to the outside environment. See, for instance, Tripp et al., "TAJ: Effective Taint Analysis of Web Applications", PLDI'09, Jun. 15-20, 2009, Dublin, Ireland. If there is source-to-sink data flow of sensitive information, then a leakage vulnerability is reported.

However, in certain instances, this source-to-sink data flow of information may not actually be a vulnerability.

BRIEF SUMMARY

The following summary is merely intended to be exemplary. The summary is not intended to limit the scope of the claims.

A method includes recording, during execution of a program and by a computing system, concrete values exhibited at source and sink statements in the program. The source statements read confidential information and the sink statements release the confidential information to an outside environment. The method includes determining, by the computing system, using at least the recorded concrete values and source-sink pairs whether information leakage meeting one or more quantitative criteria occurs by the program. Apparatus and program products are also disclosed.

BRIEF DESCRIPTION OF THE SEVERAL VIEWS OF THE DRAWINGS

FIG. 2, including

DETAILED DESCRIPTION

Figure 1A:
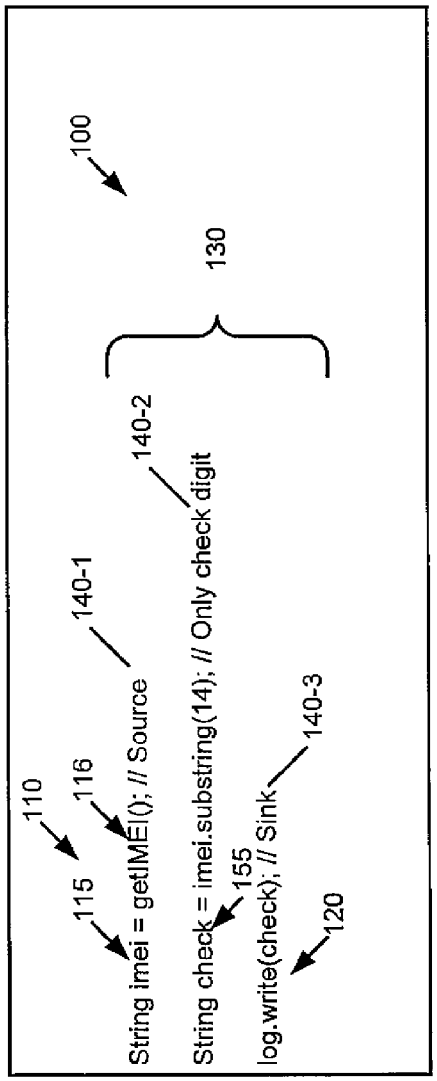
FIG. 1A shows a code snippet from a program and is used to illustrate that a source-to-sink reachability criterion is overly conservative.

As stated above, in certain instances, source-to-sink data flow of information may not actually be a vulnerability. For instance, if only the last digit of the IMEI leaks, then there is no release of secret information. Through this example is for the mobile IMEI, one can see that the source-to-sink reachability criterion is overly conservative. An example is shown in FIG. 1A, which shows a code snippet 130 from a program 100 and which is used to illustrate that a source-to-sink reachability criterion is overly conservative.

Figure 1B:
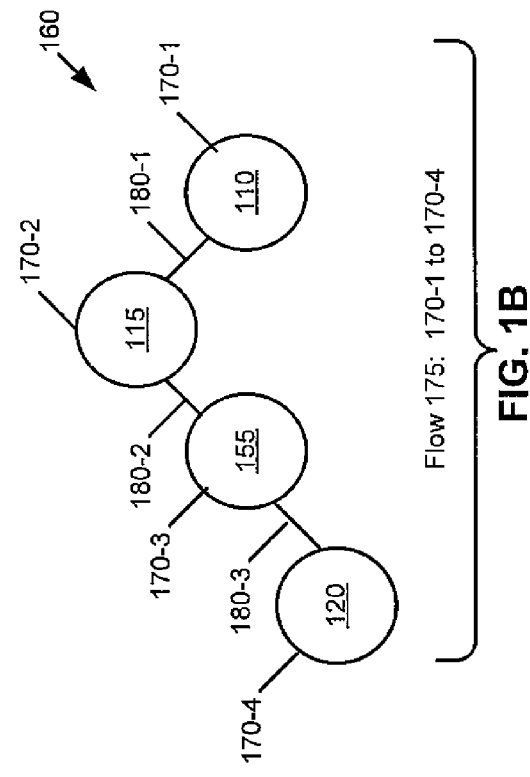
FIG. 1B is a portion of a call graph illustrating objects having calling relationships for the code snippet of FIG. 1A.

The code snippet 100 has three statements 140-1, 140-2, and 140-3. In this example, there is a source 110 that is the source statement 140-1 and a sink 120 of log.write(check) that is the sink statement 140-3. As indicated above, a source 110 reads confidential information and a sink 120 releases this information to the outside environment (that is, outside the program). The objects imei 115 and check 155 are objects through which information from the getIMEI method 116 passes. A static analysis performed on code snippet 130 could yield a number of different models of the code snippet 130. One such model is shown in FIG. 1B and is a call graph 160, which represents calling relationships between methods in the program 100. Specifically, each node 170 represents a method (as indicated in FIG. 1B) and each edge 180 indicates that there is a calling relationship between methods. FIG. 1B is a visual representation of such a call graph, and actual implementation of call graphs may not produce a visual representation (e.g., the call graph could be stored in a data structure for instance).

The sub string( ) method extracts the characters from a string, between two specified indices (e.g., "start" and "end"), and returns the new sub string. The "start" is required and indicates the position where to start the extraction. The first character is at index 0 (zero). The "end" is optional. The "end"

indicates the position (up to, but not including) where to end the extraction. If "end" is omitted, the "substring" method extracts the rest of the string. In the example of FIG. 1, the "imei.substring(14)" extracts only the fifteenth digit, which is the Luhn check digit. Thus, the string "check" is only the fifteenth digit.

Thus, while here the source-to-sink flow 175 exhibits flow 170 of sensitive data, the released information is in fact not secret. Experience has shown that examples of this kind occur a lot in practice. The reason is that the functionality of many applications requires that values computed based on confidential data become available to the external world, but these values often result from applying a reduction operation of some form to the sensitive data. For instance, the number of contacts in a person's contact list may be released but none of the identities of the contacts may be released.

Techniques for dealing with this limitation of standard data-flow analysis either build complex probabilistic mathematical models of or track flow of information at the bit level, thereby enabling a quantitative measure of information release. Building complex models is described in Alvim, et al., "Probabilistic Information Flow", 2010 25th Annual IEEE Symposium on Logic in Computer Science, 2010. Tracking information at the bit level is described in McCament and Ernst, "Quantitative Information Flow as Network Flow Capacity", PLDI'08, Jun. 7-13, 2008, Tucson, Ariz., USA.

There are two fundamental problems with these existing approaches. The first problem is implementability. It is not clear how to implement either of these approaches so that the approach can work in real time, enforcing a precise notion of information leakage while having an overhead that is sufficiently low to be tolerable by users. The second problem is accuracy. Ultimately the question of vulnerable information release requires direct comparison between the values read at the source and released at the sink. Tracking single bits, or reasoning about the probability that the value read at the source is released as-is at the sink, are both too naïve to deal with real-world instances of information release.

In contrast to conventional techniques, exemplary embodiments herein target the problem of detecting vulnerable instances of information leakage at runtime, during dynamic execution of the target program. This entails using a runtime tracking method that is both efficient and accurate. An exemplary proposal herein is to record the concrete values exhibited at source and sink statements, along with thread ID (identification). It is noted that it is possible to perform the techniques herein without using the thread ID. However, the thread ID is a useful heuristic that can improve precision. Then, for pair (x,t) and (y,t), where x and y are the data values arising at the source and the sink, respectively, and t is the thread ID (and thus both pairs are due to the same execution thread), the similarity is computed between x and y as, e.g., diff(x,y). The "diff(x,y)" is an identifier that signifies the distance between the data values x and y according to some metric space (e.g., Levenshtein distance). If the result shows x and y to be sufficiently similar (e.g., by a predetermined "small" distance such as a few characters or some percentage of the total characters being different, such as 10 percent difference), then the potential information leakage is reported to the user, e.g., along with a quantitative measure of how much information was (or is about to be) leaked.

An exemplary advantage of the instant approaches, in contrast with taint tracking, is that there is no need to instrument the entire program. Instead, only source and sink statements may undergo instrumentation. The number of these statements is typically negligible compared to all statements in the program, and thus this is a significant source of overhead reduction. Regarding accuracy, the instant exemplary approaches are founded on the assumption that if a person triggers an operation that leads to reading a secret (the invocation of a source statement), followed by release of a value that is "similar" to the one read at the source statement, then a vulnerability has occurred. For this reason, it is required in an exemplary embodiment that the same thread ID be present. A more general statement of this is that the sink invocation (i.e., the actual information release) occurs in response to the operation triggering the source call (i.e., reading of the secret data). Following this rationale, it does not really matter if the data arising at the sink is derived (either directly or indirectly) from the source call. A malicious party observing this data has reason to believe that the data is the information read at the source because the data arises along a flow involving the source, and the actual value is similar to the secret.

Figure 1C:
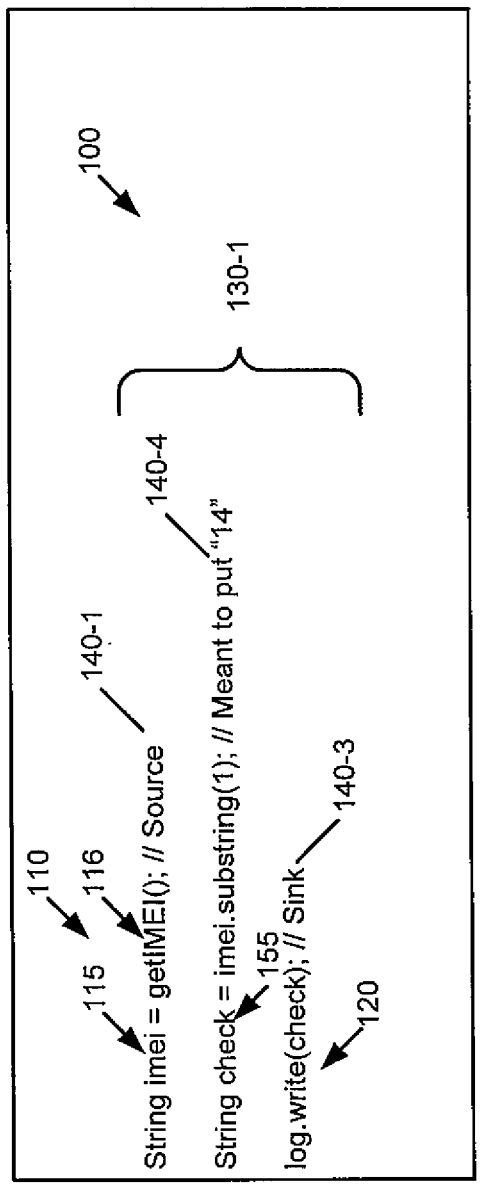
FIG. 1C shows a slightly modified version of the code snippet from the program of FIG. 1A and is used to illustrate a leakage instance.

Before proceeding with a description of a logic flow diagram that represents exemplary main components of a system as well as their flow of interaction, it is helpful to examine a case where a leakage instance occurs. FIG. 1C shows a slightly modified version of the code snippet from the program of FIG. 1A and is used to illustrate such a leakage instance. In this case, the programmer meant to put "14" inside the parenthetical for the imei.substring method (as in statement 140-2 of FIG. 1A), but put the number "1" inside the parenthetical instead, as illustrated by the statement 140-4. This means that the value written to the sink 120 log.write (check) would be every digit of the IMEI except the first digit. Thus, a leakage instance should be reported and a corresponding a quantitative measure could indicate that 15 digits (of 16 digits) are the same between the source value and the sink value. Thus, a large amount (in terms of bits) of the original sink value will be released.

Figure 2A:
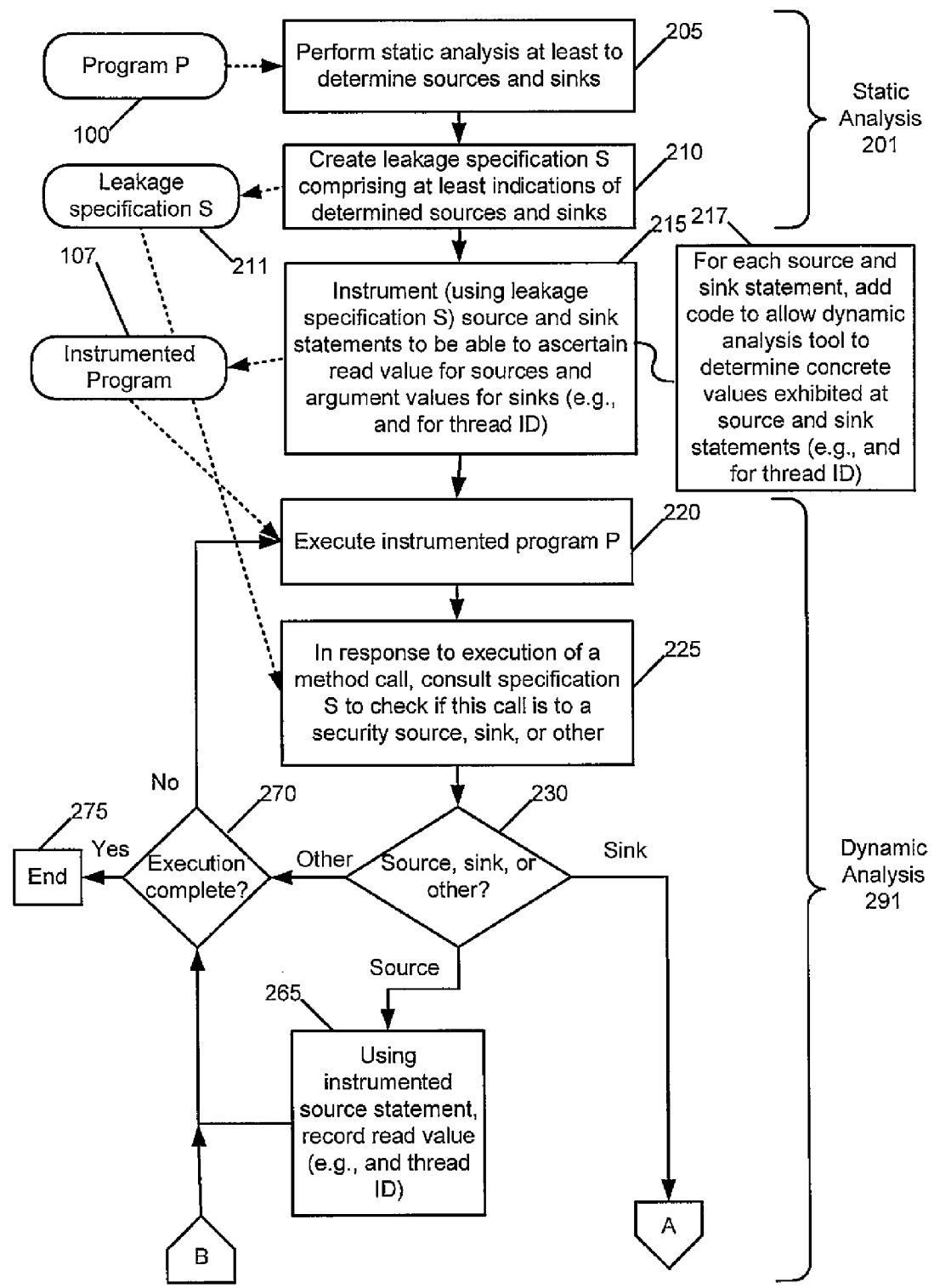
FIGS. 2A and 2B, is a logic flow diagram for quantitative analysis of information leakage vulnerabilities, and illustrates the operation of an exemplary method, a result of execution of computer program instructions embodied on a computer readable memory, and/or functions performed by logic implemented in hardware, in accordance with an exemplary embodiment.
Figure 2B:
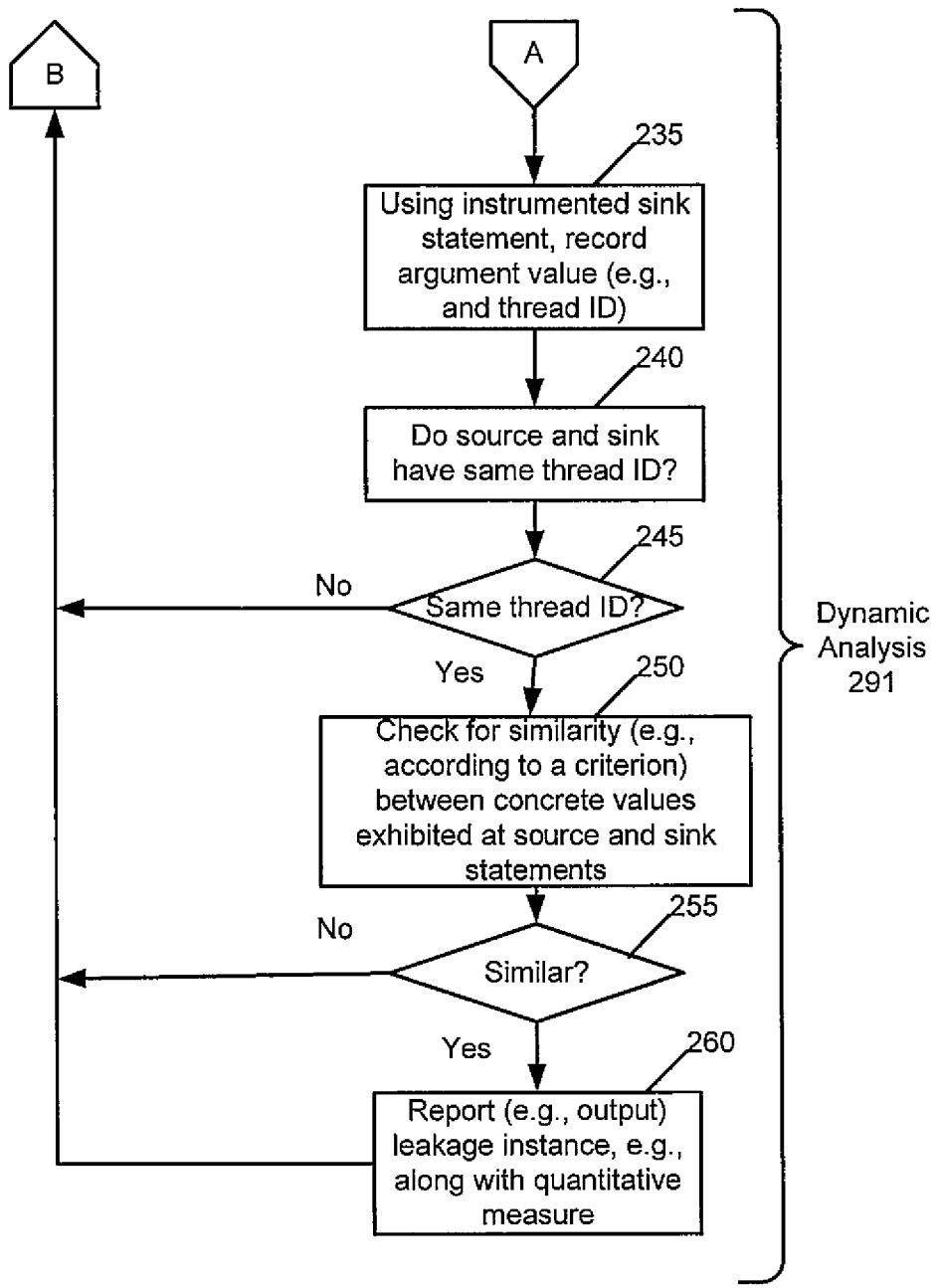

Turning to FIG. 2, which includes both FIGS. 2A and 2B, a logic flow diagram is shown for quantitative analysis of information leakage vulnerabilities. Furthermore, FIG. 2 illustrates the operation of an exemplary method, a result of execution of computer program instructions embodied on a computer readable memory, and/or functions performed by logic implemented in hardware, in accordance with an exemplary embodiment. Additionally, the blocks in FIG. 2 may be considered to represent means for performing the functions therein.

The flow of FIG. 2 is divided into at least a static analysis 201 and a dynamic analysis 291. The static analysis 201 is an analysis of the program P 100 performed without executing code in the program 100. Instead, one or more models (such as the call graph 160) of the program are built and used to analyze the program. Meanwhile, dynamic analysis 291 is performed by analyzing an executing program (in this case, an instrumented program). International Business Machine's (IBM's) Security Appscan software program is an example of a tool that provides both static and dynamic analyses. There are many other off-the-shelf tools that provide one or both of static analysis or dynamic analysis capabilities. Additionally, examples of static analysis are provided in Tripp et al., "TAJ: Effective Taint Analysis of Web Applications", PLDI'09, Jun. 15-20, 2009, Dublin, Ireland, examples of a hybrid analysis with both dynamic analysis and static analysis are provided in Tripp and Weisman, "Hybrid Analysis for JavaScript Security Assessment", ESEC/FSE'11: ACM Conference on the Foundations of Software Engineering (2011), and examples of dynamic analysis is provided in Liang et al., "A Dynamic Evaluation of the Precision of Static Heap Abstractions", Object-Oriented Programming, Systems, Languages & Applications, 2010.

Figure 3:
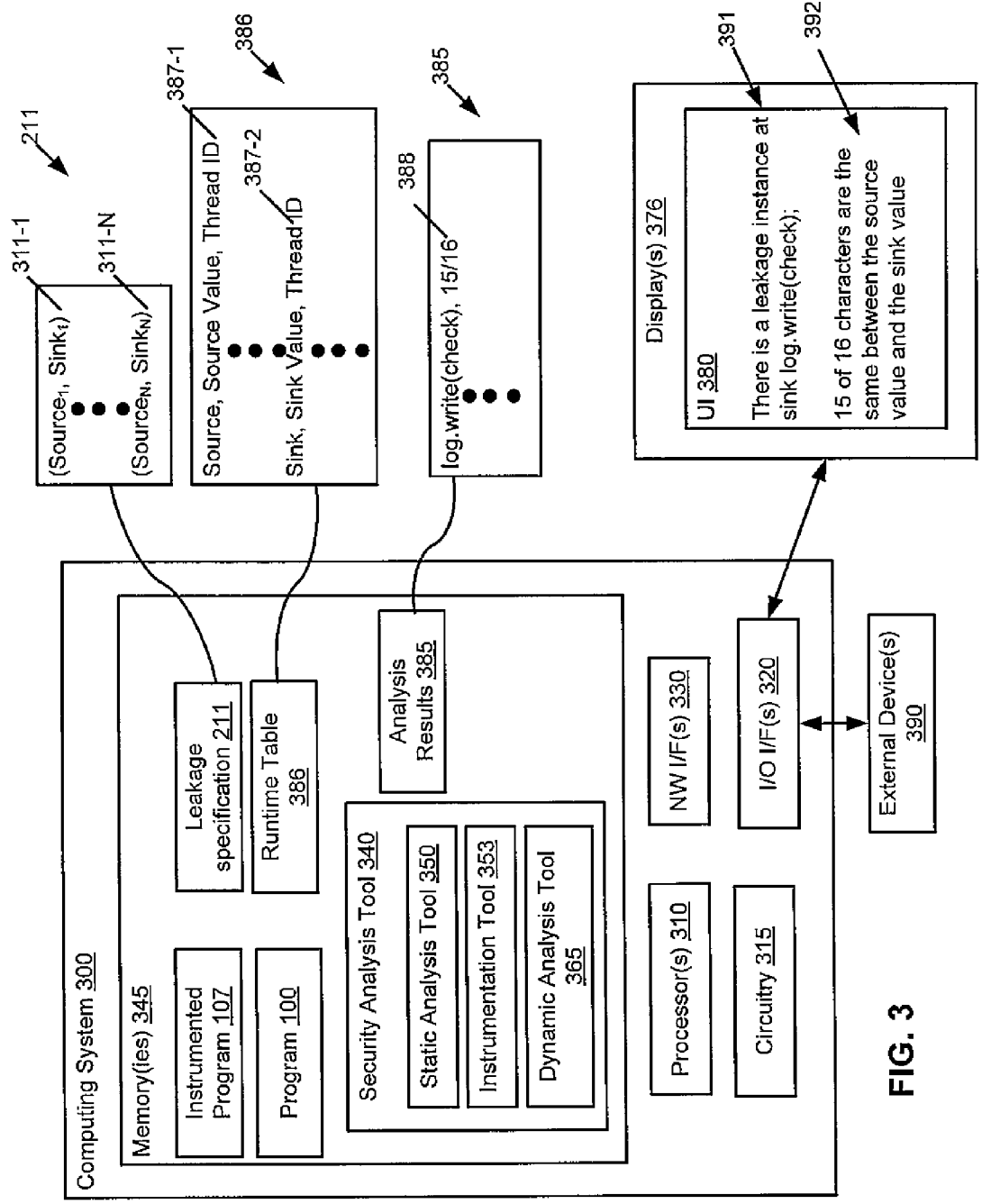
FIG. 3 is a block diagram of an example of a system suitable for performing the exemplary embodiments herein.

Consequently, and turning briefly to FIG. 3, it is assumed there is a computing system 300 that performs the operations in the blocks in FIG. 2, e.g., under control at least in part of the security analysis tool 340. That is, the security analysis tool 340 causes the computing system 300 to perform the operations in the blocks in FIG. 2. The security analysis tool 340 includes a static analysis tool 350, which is assumed to cause the computing system 300 to perform the operations in blocks 205-210. The security analysis tool 340 also has a dynamic analysis tool 365, which is assumed to cause the computing system 300 to perform the operations in blocks 220-275. Additionally, the static analysis tool 350 includes an instrumentation tool 353, which is used to instrument sources 110 and sinks 120, as is described below, and is assumed to cause the computing system 300 to perform the operations in block 215. FIG. 3 is described in more detail below.

Turning back to FIG. 2, concerning static analysis 201, in block 205, the computing system 300 performs static analysis of the program P 100 at least to determine sources 110 and sinks 120. As stated above, the source 110 is the statement 140-1 (of "String imei=getIMEI( )") and the sink 140-3 is statement 140-3 (of "log.write(check)"). Based upon the sources 110 and sinks 120, the computing system 300 in block 210 creates leakage specification S 211 comprising at least indications of the determined sources 110 and sinks 120. It is assumed in this example that blocks 205 and 210 determine all sources 110 and sinks 120 in the program 100.

In block 215, the computing system 300 instruments (using leakage specification S 211) sources 110 and sinks 120 to be able to ascertain read values for sources and argument values for sinks. Instrumentation refers to an ability to monitor certain aspects of a program 100. In this case, the dynamic analysis tool 365 needs to determine concrete values exhibited at source and sink statements 140. Those concrete values are the read values for sources and argument values for sinks. A computing system 300 can instrument source and sink statements 140 by adding code (block 217) to the program 100 to create the instrumented program 107, which provides this capability of determining concrete values. Such added code could provide communication of the concrete values (e.g., the read value for the source or the argument value for the sink. For instance, the added code could write the concrete values to the dynamic analysis tool 365, e.g., "writeValuetoDynamicAnalysis(imei)", or could write the concrete values to a data structure readable by the dynamic analysis tool 365, e.g., "writeValuetoDataStructure(check)", or through other suitable techniques.

It is noted that similar code may be added (blocks 215 and 217) in order for the program 107 to communicate the thread ID, at the source 110 or the sink 120. For instance, the getThreadId( )method may be used in JAVA (a programming language and computing platform first released by Sun Microsystems in 1995) to determine a thread ID, and statements similar to those above can be added to the program 100 (to create the instrumented program 107) and to allow the instrumented program 107 to communicate the thread ID to the dynamic analysis tool 365. Similar types of thread identification methods may be used in other languages.

It is noted that the static analysis and instrumentation is typically performed using source code. However, other code such as executable code may also be used.

In this example, the instrumentation performed in block 215 is not considered to be part of the static analysis 201, and is performed subsequently to the static analysis 201. However, block 215 could be performed as part of the static analysis 201, such as in block 205, for each determined source 110 or sink 120. Note that it is typically the case that a source-sink pair is used, as there could be, for instance, information from sources that does not reach sinks, and sinks that do not use information from sources. Additionally, although multiple sources may terminate in a single sink, for ease of tracking and other reasons, these are viewed from the perspective of individual source-sink pairs.

Block 220 begins the dynamic analysis 291 and the execution of the instrumented program 107. That is, an executable version of the instrumented program 107 is executed and the dynamic analysis tool 365 then examines the executable version. The computing system 300, in block 225, in response to execution of a method call, consults specification S 211 to check whether this is a security source, sink, or other. The "other" is a method call that does not relate to a source 110 or sink 120. It is noted that the dynamic analysis tool 365 can determine when a method call is performed through instrumentation corresponding to the method call (as is known and performed in current systems). In block 230, the computing system 300 determines whether this is a call to a source 110, sink 120, or other.

If the call is to method other than a source 110 or a sink 120 (block 230=Other), the flow continues to block 270. In block 270, the computing system 300 determines whether the execution is complete. If the execution is not complete (block 270=No), flow returns to block 220, where execution of the instrumented program 107 is continue. If execution is complete (block 270=Yes), the flow ends in block 275.

If the call is to a source 110 (block 230=Source), the computing system 300 in block 265, using the instrumented source statement, records the read value. Typically, as described above, this may be performed via code added to the program 100 (and in the instrumented program 107) to communicate the read value to the dynamic analysis tool 365. The thread ID may also be recorded in block 265. Note the thread ID is also communicated via the instrumented program 107 to the dynamic analysis tool 365, e.g., using code added to the program 100. The flow then proceeds to block 270.

If the call is to a sink 120 (block 230=Sink), flow proceeds to block 235. In block 235, the computing system 300, using the instrumented sink statement 145, records the argument value. Typically, as described above, this may be performed via code added to the program 100 (and in the instrumented program 107) to communicate the argument value to the dynamic analysis tool 365. The thread ID may also be recorded in block 235. Note the thread ID is also communicated via the instrumented program 107 to the dynamic analysis tool 365, e.g., using code added to the program 100. Additionally, the thread ID may be recorded in block 235. Note that examination and recording of the thread ID is optional. Further, note that the analysis simply sees occurrences of sources and sinks. These could come from different threads, e.g., in response to unrelated events. In block 240, it is determined if the source 110 and sink 120 have the same thread ID. If not (block 245=No), flow proceeds to block 270.

If so (block 245=Yes), flow proceeds to block 250, where the computing system 300 checks for similarity (e.g., according to a criterion) between concrete values exhibited at source and sink statements. The Levenshtein distance is one such example. Another example is the Hamming distance (if the strings have the same length). The concrete values are the recorded read value stored in block 265 and the recorded argument value stored in block 235. In FIG. 1A for instance, the recorded read value would be the value of the IMEI in the string "imei" 115 that is set by the method getIMEI( ) 116. The recorded argument value is the value of the string "check", which is passed to the sink 120 of log.write.

If the two concrete values for the source and sink statements are not similar (block 255=No), the flow proceeds to block 270. If the two concrete values for the source and sink statements are similar (e.g., according to a criterion) (block 255=Yes), in block 260 the computing system 300 reports (e.g., outputs) the leakage instance, e.g., along with a quantitative measure to provide a measure of the importance of the leakage. This is explained in more detail below.

It is noted that the flow in FIG. 2 is merely exemplary. For instance, the dynamic analysis 291 is assumed to comprise blocks 220-275. However, it would be possible for a dynamic analysis 291 to simply record concrete values for sinks and sources. Flow after block 235 would then proceed to block 270. Once execution of the program is complete (block 270=Yes), then blocks 240-260 may be performed.

Referring to FIG. 3, this figure provides an overview of a computing system 300 suitable for use with exemplary embodiments herein. The computing system 300 comprises one or more memories 345, one or more processors 310, one or more I/O interfaces 320, and one or more wired or wireless network interfaces 330. Alternatively or in addition to the one or more processors 310, the computing system 300 may comprise circuitry 315. The computing system 300 is coupled to or includes one or more displays 376 and one or more external device(s) 390. In one example, the one or more memories 345 comprise an instrumented program 107, a program 100, a leakage specification 211, a runtime table 386, a security analysis tool 340, and analysis results 385. The security analysis tool 140 includes a static analysis tool 350, an instrumentation tool 353, and a dynamic analysis tool 365.

The security analysis tool 340, in an exemplary embodiment, is implemented computer-readable program code that is executable by the one or more processors 310 to cause the computing system 300 to perform one or more of the operations described herein. In another example, the operations may also be performed, in part or completely, by circuitry 315 that implements logic to carry out the operations. The circuitry 315 may be implemented as part of the one or more processors 310 or may be separate from the one or more processors 310. The processors 310 may be any processing units, such as digital signal processors and/or single-core or multi-core general purpose processors. The circuitry 315 may be any electronic circuit such as an application specific integrated circuit or programmable logic. In an example, the static analysis tool 350 causes the computing system 300 to perform the static analysis 201 of FIG. 2, the instrumentation tool 353 causes the computing system 300 to perform block 215 of FIG. 2, and the dynamic analysis tool 365 causes the computing system 300 to perform the dynamic analysis 291 of FIG. 2.

The memories 345 may comprise non-volatile and/or volatile RAM (random access memory), cache memory, NAND-based flash memory, long term storage (e.g., hard drive), and/or read only memory. The one or more I/O interfaces 320 may include interfaces through which a user may interact with the computing system 300. The display(s) 376 may be a touchscreen, flatscreen, monitor, television, projector, as examples.

A user interacts with the security analysis tool 340 through the UI 180 on the display 376 in an exemplary embodiment or through the network interface(s) 330 in another non-limiting embodiment. The external device(s) 390 enable a user to interact in one exemplary embodiment with the computing system 300 and may include a mouse, trackball, keyboard, and the like. The network interfaces 330 may be wired and/or wireless and may implement a number of protocols, such as cellular or local area network protocols. The elements in computing system 300 may be interconnected through any technology, such as buses, traces on a board, interconnects on semiconductors, and the like.

An exemplary leakage specification 211 is shown as a plurality (N) of source-sink pairs 311, where each source-sink pairs comprises one source 110 and one corresponding sink 120 such that a flow 175 of possibly tainted input flows from the source 110 to the sink 120. In FIGS. 1A and 1C, the source 110 is the statement 140-1 and the sink 120 is log.write (check). It is noted that additional material could be stored, such as locations (e.g., lines) in the program 100 where the source and sink are.

A runtime table 386 is one example of what might be created by the dynamic analysis tool 365 during the dynamic analysis 291. It is noted that a "table" is used for simplicity and the actual implementation may vary. The runtime table 386 may be created and updated when block 265 is performed, which is where the read value and thread ID for the source are recorded. Additionally, the runtime table 386 may be created and updated when block 235 is performed, which is where the argument value and the thread ID for the sink are recorded. In this example, the runtime table 386 includes an entry 387-1 having a source, a source value, and a thread ID. The "source" in the runtime table 386 would be one of the sources in the source-sink pairs 311. The runtime table 386 includes an entry 387-2 having a sink, a sink value, and a thread ID. The "sink" in the runtime table 386 would be one of the sinks in the source-sink pairs 311.

Also shown is an exemplary analysis results 385, which in this example contains an entry 388 of "log.write(check)", which is an indication of the sink 120, and "15/16", which is an indication of a quantitative measure of the amount of information release. This example assumes the scenario of FIG. 1C, where the string "check" includes 15 of the 16 characters in the IMEI from the getIMEI method 116. The dynamic analysis tool 365 in this example also outputs on UI 380 an indication 391 of the leakage instance corresponding to the sink in the entry 388 in the analysis results 385. The indication 391 states "There is a leakage instance at sink log.write(check);". The dynamic analysis tool 365 in this example also outputs on UI 380 an indication 392 of the quantitative measure in the entry 388 in the analysis results 385. The indication 392 states "15 of 16 characters are the same between the source value and the sink value".

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include a propagating wave.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    performing static analysis of a program at least to determine sources and sinks in the program, wherein the static analysis comprises creating a leakage specification comprising at least indications of determined sources and sinks;
    instrumenting, using the leakage specification, source and sink statements in the program to be able to ascertain read values for sources and argument values for sinks, wherein the instrumenting comprises for each source and sink statement, adding code to allow a dynamic analysis tool to determine concrete values exhibited at the corresponding source statement or sink statement;
    during execution of a program performed after the instrumenting, recording by the dynamic analysis tool of a computing system concrete values exhibited at source and sink statements in the program, wherein source statements read confidential information and sink statements release the confidential information to an outside environment, and where the recording uses the code previously added to the source statements and sink statements;
    determining, by the computing system, using at least the recorded concrete values and source-sink pairs whether information leakage meeting one or more quantitative criteria occurs by the program; and
    reporting a leakage instance along with a corresponding quantitative measure in response to information leakage meeting one or more quantitative criteria occurring by the program.

2. The method of claim 1, wherein determining further comprises:

determining information leakage by the sink statement in the source-sink pair by determining a quantitative measure of an amount of information released by the sink statement in the source-sink pair; and determining whether the quantitative measure meets the one or more quantitative criteria.

3. The method of claim 2, wherein the quantitative measure of the amount of information release is a number of bits that are the same between a source value and a sink value for the source-sink pair.

4. The method of claim 3, wherein the source value and the sink value are strings.

5. The method of claim 3, wherein the number of bits that are the same between the source value and the sink value for the source-sink pair are determined using a difference function comparing the source and sink values.

6. The method of claim 5, wherein the difference function comprises one of a Levenshtein distance or a Hamming distance.

7. The method of claim 1, wherein concrete values exhibited at the source statements are values read by the source statements.

8. The method of claim 1, wherein concrete values exhibited at the sink statements are argument values used by the sink statements.

9. The method of claim 1, wherein the source-sink pairs that were previously determined by the static analysis performed on the program determine flows that start at sources in the source-sink pairs and end at corresponding sinks in the source-sink pairs.

10. The method of claim 1, wherein;
recording further comprises recording thread identifications corresponding to the source and sink statements reached in the program;
determining further comprises determining information leakage occurs only for source-sink pairs having same thread identifications for the source statement and the sink statements in individual ones of the source-sink pairs.

11. An apparatus, comprising:
one or more memories comprising computer-readable code;
one or more processors,
wherein the one or more processors are configured, in response to execution of the computer-readable code, to cause the apparatus to perform the following:
performing static analysis of a program at least to determine sources and sinks in the program, wherein the static analysis comprises creating a leakage specification comprising at least indications of determined sources and sinks;
instrumenting, using the leakage specification, source and sink statements in the program to be able to ascertain read values for sources and argument values for sinks, wherein the instrumenting comprises for each source and sink statement, adding code to allow a dynamic analysis tool to determine concrete values exhibited at the corresponding source statement or sink statement;
during execution of a program performed after the instrumenting, recording by the dynamic analysis tool of a computing system concrete values exhibited at source and sink statements in the program, wherein source statements read confidential information and sink statements release the confidential information to an outside environment, and where the recording uses the code previously added to the source statements and sink statements;
determining, by the computing system, using at least the recorded concrete values and source-sink pairs whether information leakage meeting one or more quantitative criteria occurs by the program; and
reporting a leakage instance along with a corresponding quantitative measure in response to information leakage meeting one or more quantitative criteria occurring by the program.

12. The apparatus of claim 11, wherein determining further comprises:
determining information leakage by the sink statement in the source-sink pair by determining a quantitative measure of an amount of information released by the sink statement in the source-sink pair; and
determining whether the quantitative measure meets the one or more quantitative criteria.

13. The apparatus of claim 12, wherein the quantitative measure of the amount of information release is a number of bits that are the same between a source value and a sink value for the source-sink pair.

14. The apparatus of claim 13, wherein the source value and the sink value are strings.

15. The apparatus of claim 13, wherein the number of bits that are the same between the source value and the sink value for the source-sink pair are determined using a difference function comparing the source and sink values.

16. The apparatus of claim 15, wherein the difference function comprises one of a Levenshtein distance or a Hamming distance.

17. The apparatus of claim 11, wherein concrete values exhibited at the source statements are values read by the source statements.

18. The apparatus of claim 11, wherein concrete values exhibited at the sink statements are argument values used by the sink statements.

19. The apparatus of claim 11, wherein the source-sink pairs that were previously determined by a static analysis performed on the program determine flows that start at sources in the source-sink pairs and end at corresponding sinks in the source-sink pairs.

20. The apparatus of claim 11, wherein;
recording further comprises recording thread identifications corresponding to the source and sink statements reached in the program;
determining further comprises determining information leakage occurs only for source-sink pairs having same thread identifications for the source statement and the sink statements in individual ones of the source-sink pairs.

21. A computer program product comprising a non-transitory computer readable storage medium having program code embodied therewith, the program code executable by a computing system to cause the computing system to perform:
performing static analysis of a program at least to determine sources and sinks in the program, wherein the static analysis comprises creating a leakage specification comprising at least indications of determined sources and sinks;
instrumenting, using the leakage specification, source and sink statements in the program to be able to ascertain read values for sources and argument values for sinks, wherein the instrumenting comprises for each source and sink statement, adding code to allow a dynamic analysis tool to determine concrete values exhibited at the corresponding source statement or sink statement;

during execution of a program performed after the instrumenting, recording by the dynamic analysis tool of a computing system concrete values exhibited at source and sink statements in the program, wherein source statements read confidential information and sink statements release the confidential information to an outside environment, and where the recording uses the code previously added to the source statements and sink statements;

determining, by the computing system, using at least the recorded concrete values and source-sink pairs whether information leakage meeting one or more quantitative criteria occurs by the program; and reporting a leakage instance along with a corresponding quantitative measure in response to information leakage meeting one or more quantitative criteria occurring by the program.

* * * * *